United States Patent
Jeong

(10) Patent No.: US 9,584,246 B2
(45) Date of Patent: Feb. 28, 2017

(54) WAVELENGTH DIVISION MULTIPLEXING OPTICAL RECEIVER

(71) Applicant: FUJITSU LIMITED, Kawasaki-shi, Kanagawa (JP)

(72) Inventor: Seokhwan Jeong, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/844,432

(22) Filed: Sep. 3, 2015

(65) Prior Publication Data

US 2015/0381301 A1 Dec. 31, 2015

Related U.S. Application Data

(63) Continuation of application No. PCT/JP2013/058299, filed on Mar. 22, 2013.

(51) Int. Cl.
*H04B 10/60* (2013.01)
*H04J 14/02* (2006.01)
(Continued)

(52) U.S. Cl.
CPC ............... *H04J 14/02* (2013.01); *G02B 6/126* (2013.01); *G02B 6/2861* (2013.01);
(Continued)

(58) Field of Classification Search
CPC . G02B 6/29397; G02B 6/126; G02B 6/29383; G02B 6/29386; G02B 6/29343; G02B 6/29302; G02B 6/2861; G02B 6/29395; H04J 14/02; H04J 14/06; H04B 10/60
(Continued)

(56) References Cited

U.S. PATENT DOCUMENTS 5,008,958 A * 4/1991 Cimini, Jr. ........... H04B 10/532
398/204
5,295,013 A * 3/1994 Ono ....................... H04B 10/66
398/152

(Continued)

FOREIGN PATENT DOCUMENTS

JP 2009-244326 A1 10/2009

OTHER PUBLICATIONS

Liu et al, Waveguide Integrated Ge pin Photodetectors on a Silicon on Insulator Platform , Nov. 2006, IEEE, pp. 1-4.*

(Continued)

*Primary Examiner* — Ken N Vanderpuye
*Assistant Examiner* — Dibson Sanchez
(74) *Attorney, Agent, or Firm* — Kratz, Quintos & Hanson, LLP

(57) ABSTRACT

The present invention relates to a wavelength division multiplexing optical receiver and eliminates excess loss of one polarization component while eliminating the need for a polarization-independent operation of a light receiver. An input waveguide, made of a silicon wire waveguide, is connected to a loop waveguide equipped with a polarization rotator over a polarization beam splitter. A ring waveguide equipped with an output waveguide configuring an add-drop ring resonator array is optically connected to the loop waveguide. The output light from ports at both sides of the output waveguide is incident onto first and second light-receiving surfaces of a light receiver such that the optical distances are equal to each other.

5 Claims, 11 Drawing Sheets

(51) Int. Cl.
*G02B 6/293* (2006.01)
*G02B 6/126* (2006.01)
*G02B 6/28* (2006.01)
*H04J 14/06* (2006.01)

(52) U.S. Cl.
CPC ..... *G02B 6/29302* (2013.01); *G02B 6/29343* (2013.01); *G02B 6/29383* (2013.01); *G02B 6/29386* (2013.01); *G02B 6/29395* (2013.01); *G02B 6/29397* (2013.01); *H04B 10/60* (2013.01); *H04J 14/06* (2013.01)

(58) Field of Classification Search
USPC .......................................... 398/79, 202–214
See application file for complete search history.

(56) References Cited

U.S. PATENT DOCUMENTS

| | | | | | |
|---|---|---|---|---|---|
| 5,809,184 | A | * | 9/1998 | Doerr | G02B 6/12016 385/11 |
| 5,837,995 | A | * | 11/1998 | Chow | H04B 10/032 250/214 LS |
| 6,636,668 | B1 | * | 10/2003 | Al-hemyari | G02B 6/12007 385/16 |
| 2002/0131135 | A1 | * | 9/2002 | Chow | G02B 6/4202 398/202 |
| 2003/0235367 | A1 | * | 12/2003 | Yamazaki | G02B 6/29343 385/39 |
| 2005/0117915 | A1 | * | 6/2005 | Miyazaki | H04B 10/5051 398/188 |
| 2005/0265732 | A1 | * | 12/2005 | Jennen | H04B 10/69 398/186 |
| 2006/0147219 | A1 | * | 7/2006 | Yoshino | H04B 10/548 398/183 |
| 2007/0047971 | A1 | * | 3/2007 | Ikeuchi | H04B 10/677 398/202 |
| 2008/0123188 | A1 | * | 5/2008 | Klein | G02B 6/12007 359/484.09 |
| 2009/0003755 | A1 | * | 1/2009 | Liu | G02F 1/2257 385/3 |
| 2010/0183312 | A1 | * | 7/2010 | Bolla | G02B 6/12007 398/85 |
| 2010/0322631 | A1 | * | 12/2010 | Nagarajan | G02B 6/12004 398/65 |
| 2014/0064729 | A1 | * | 3/2014 | Assefa | G02B 6/12023 398/65 |
| 2015/0260914 | A1 | * | 9/2015 | Zheng | G02B 6/126 385/11 |

OTHER PUBLICATIONS

International Search Report for International Application No. PCT/JP2013/058299 dated Apr. 16, 2013.

\* cited by examiner

WAVELENGTH DIVISION MULTIPLEXING OPTICAL RECEIVER

CROSS-REFERENCE TO RELATED APPLICATION

This application is a continuation application of International Application PCT/JP2013/058299 filed on Mar. 22, 2013 and designated the U.S., the entire contents of which are incorporated herein by reference.

FIELD

The present invention relates to a wavelength division multiplexing optical receiver, and in particular, to a wavelength division multiplexing optical receiver using silicon wire waveguides used for optical communication and optical interconnection.

BACKGROUND

In recent years, silicon photonics has attracted attention as a promising technology for large capacity interconnection and it is expected to increase the transmission capacity per optical wire within Si chips through wavelength division multiplexing (WDM).

In order to transmit and receive WDM optical signals within a Si chip, it is necessary to multiplex (MUX) or demultiplex (DeMUX) the WDM optical signals by using a wavelength multiplexer/demultiplexer (MUX/DeMUX) if necessary. Usually, Si wire waveguides have a very large structural birefringence. Therefore, the transmission properties of a MUX/DeMUX formed of Si wire waveguides differ significantly depending on the polarization state of optical signals. That is to say, normal operation is possible only in the polarization state of either the TE mode or the TM mode.

Meanwhile, the polarization state is not kept constant in the transmission path of optical signals. Therefore, optical signals that enter into a light-receiving unit formed of a Si wire DeMUX and a light receiver (photodiode) are polarized into random components and thus deterioration of the reception properties is inevitable depending on the polarization state.

In order to overcome this problem, a WDM polarization diversity configuration that includes Si wire waveguides has been proposed. Here, a conventional wavelength division multiplexing optical receiver is described in reference to FIG. 12. FIG. 12 is a schematic plan diagram illustrating a conventional wavelength division multiplexing optical receiver, where a WDM optical signal that has entered into an input waveguide 71 made of a silicon wire waveguide is divided into TE beam and TM beam of which the polarization planes are orthogonal to each other by means of a directional coupler type polarization beam splitter (PBS) 72 made of silicon wire waveguides so as to be outputted into a loop waveguide 73 made of a silicon wire waveguide. The TM beam has its polarization plane rotated 90° by an eccentric double core type polarization rotator (PR) 74 made of a silicon wire waveguide inserted into the loop waveguide 73 and is outputted as TE* beam. In contrast, the TE beam, which has been divided by the polarization beam splitter 72, retains its polarization plane as it is guided through the loop waveguide 73.

TE beams that are guided in opposite directions to each other through the loop waveguide 73 are demultiplexed to the respective wavelengths due to the demultiplexing functions of add-drop micro-ring resonators (AD-MRRs) $75_1$ and $75_2$ wherein the optical paths thereof differ in length. The respective TE beams that have been demultiplexed are outputted into loop waveguides $76_1$ and $76_2$ having polarization rotators $77_1$ and $77_2$ and optical path length compensation waveguides $78_1$ and $78_2$.

From among the outputted TE beams, the TE* beam that is guided through the loop waveguide $76_1$ or $76_2$ in the clockwise direction in the figure has its polarization plane rotated 90° by the polarization rotator $77_1$ or $77_2$ so as to be outputted as a TM beam and is inputted into a polarization multiplexer $79_1$ or $79_2$. At this time, the TE beam that is guided through the loop waveguide $76_1$ or $76_2$ in the counterclockwise direction in the figure is inputted into the directional coupler type polarization multiplexer $79_1$ or $79_2$ at a timing that is made to match the TM beam by the optical path length compensation waveguide $78_1$ or $78_2$ so as to be multiplexed (MUX), and is divided into the respective wavelengths when outputted from the output waveguide $80_1$ or $80_2$ so as to be received by light receivers (not shown).

In this case, the MDW beams that enter the AD-MRR have a constant polarization state, that is to say in the TE mode or in the TE* mode, and therefore the deterioration in the properties due to the demultiplexing (DeMUX) can be prevented. Accordingly, WDM optical signals can be multiplexed or demultiplexed without being affected by the polarization state of the WDM optical signals that enter the AD-MRR.

CITATION LIST

Patent Literature

Japanese Unexamined Patent Publication 2009-244326

In the case of the above-described wavelength division multiplexing optical receiver, such a problem arises that one polarization component (TM beam in the case of FIG. 12) suffers great excess loss when two polarization components are separated for signal processing. In addition, in the case where waves are detected through the connection of a light receiver, it is indispensable for the light receiver to operate independently of the polarization because the two polarization components enter the light receiver and thus it is difficult to increase the efficiency of the receiving operation due to the restriction in the structure of the light receiver. Furthermore, two polarization rotators and two polarization multiplexers are necessary at the second stage and thereafter, and therefore such a problem arises that the structure becomes complex.

SUMMARY

One disclosed aspect provides a wavelength division multiplexing optical receiver including an input waveguide made of a silicon wire waveguide; a polarization beam splitter connected to the input waveguide in order to divide light inputted from the input waveguide into a first signal and a second signal in accordance with the polarization plane; a loop waveguide connected to the output end of the polarization beam splitter and made of a silicon wire waveguide through which the first signal and the second signal propagate in opposite directions from each other; a polarization rotator inserted into the loop waveguide in order to rotate the polarization plane of the second signal by 90°; a number of ring waveguides made of silicon wire waveguides having different optical path lengths optically coupled to the loop waveguide on the add port side; output waveguides made of silicon wire waveguides optically coupled to each of the ring waveguides on the drop port side and having two output ports; and light receivers connected to an output waveguide without having to go via a polarization rotator or a polarization multiplexer in such a manner that the optical distances between the polarization beam splitter and a first light-receiving surface and between the polarization beam splitter and a second light-receiving surface are equal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1A:
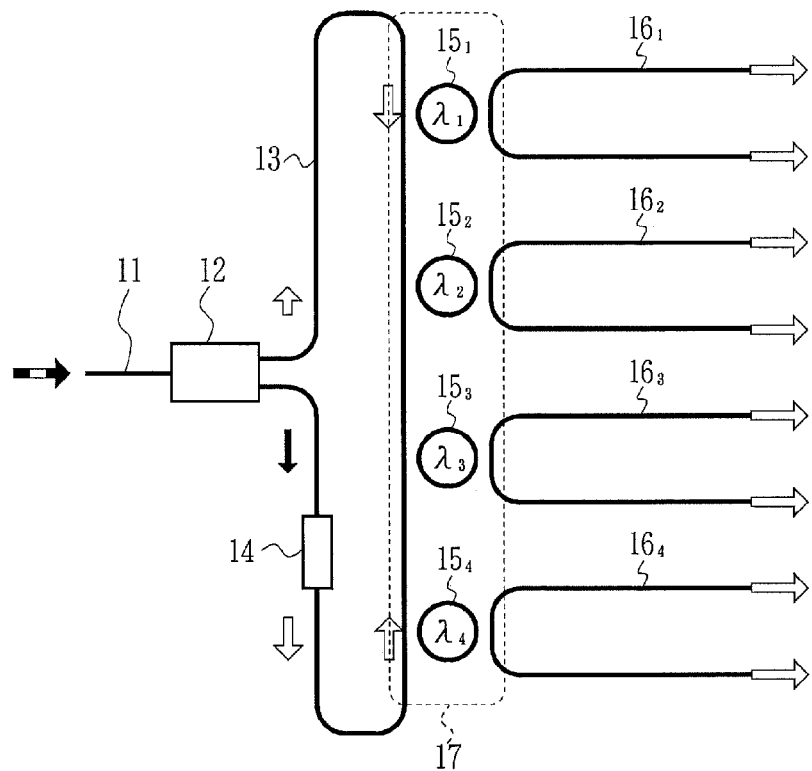
FIGS. 1A and 1B are diagrams for illustrating the wavelength division multiplexing optical receiver according to an embodiment of the present invention.
Figure 1B:
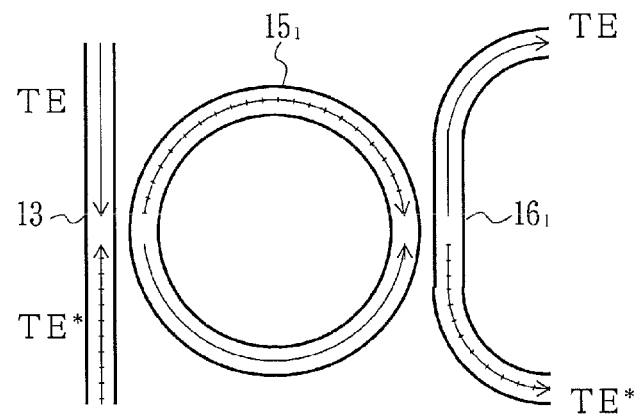

Here, the wavelength division multiplexing optical receiver according to one embodiment of the present invention is described in reference to FIGS. 1A to 1B. FIGS. 1A and 1B are diagrams for illustrating the wavelength division multiplexing optical receiver according to one embodiment of the present invention. FIG. 1A is a schematic plan diagram and FIG. 1B is a diagram illustrating an enlarged main portion of the state of propagating light. An input waveguide 11 made of a silicon wire waveguide is connected to apolarization beam splitter 12 for splitting multiplexing light that has entered from the input waveguide 11 into a first signal and a second signal in accordance with the polarization plane. The output end of this polarization beam splitter 12 is connected to a loop waveguide 13 made of a silicon wire waveguide through which the first signal and the second signal propagate in opposite directions from each other, and this loop waveguide 13 is connected to a polarization rotator 14. Here, the polarization beam splitter 12 and the polarization rotator 14 may be an appropriate polarization beam splitter and an appropriate polarization rotator selected from publicly known polarization beam splitters and polarization rotators that operate on the basis of various types of principles.

In addition, the loop waveguide 13 is optically coupled to a number of ring waveguides $15_1$ through $15_4$ that are made of silicon wire waveguides wherein the optical paths thereof differ in length, and that form an add-drop type ring resonator array 17. Furthermore, on the drop port side each of these ring waveguides $15_1$ through $15_4$ is optically coupled to an output waveguide $16_1$ to $16_4$ made of a silicon wire waveguide having two output ports. This add-drop ring resonator array becomes a demultiplexer (DeMUX). While the figure includes illustrations of four ring waveguides for the purpose of simplicity, more than four (eight or sixteen, for example) ring waveguides can actually be provided in accordance with the wavelength band of the WDM light.

Each of the output waveguides $16_1$ through $16_4$ extending from these two output ports is connected to a light receiver (not shown) in such a manner that the optical distance is equal between the polarization beam splitter 12 and the first light-receiving surface and between the polarization beam splitter 12 and the second light-receiving surface.

Figure 2A:
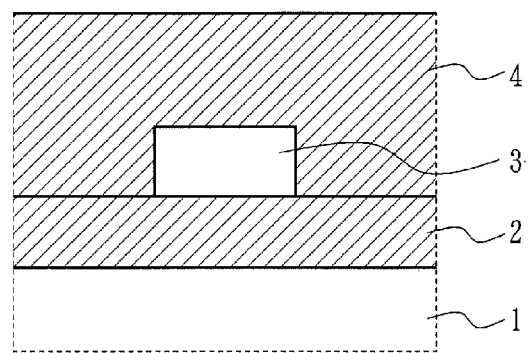
FIGS. 2A and 2B are a diagram and a graph for illustrating the dependency of the skew on the difference in the optical path wavelength in the wavelength division multiplexing optical receiver according to an embodiment of the present invention.
Figure 2B:
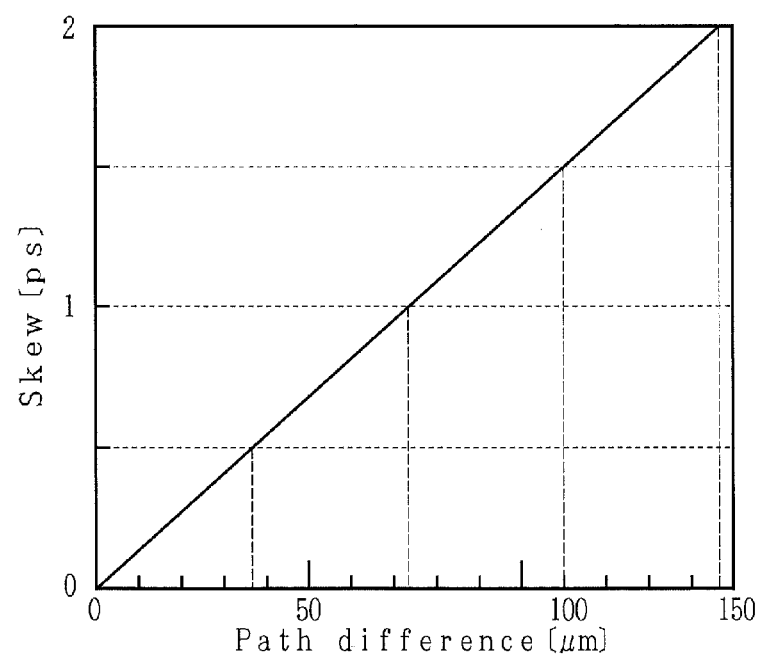

FIGS. 2A and 2B are a diagram and a graph for illustrating the dependency of the skew on the difference in the optical path wavelength in the wavelength division multiplexing optical receiver according to an embodiment of the present invention. FIG. 2A is a schematic cross-sectional diagram illustrating a silicon wire waveguide and FIG. 2B illustrates the resulting properties of simulation of the skew versus the difference in the length of the optical path. As illustrated in FIG. 2A this simulation is performed for a silicon wire waveguide 3 made of a rectangular core layer having a width of 480 nm and a height of 250 nm. Here, symbols 1, 2 and 4 in the figure are a silicon substrate, $SiO_2$ layers that become a lower clad layer and an upper clad layer respectively.

From the point of view of reception efficiency, it is necessary to restrict the time difference between signals that are inputted through the first light-receiving surface and the second light-receiving surface (skew) to the minimum. When a modulation frequency of 25 GHz is assumed (1 bit≈40 ps), for example, it is desirable for the skew to be as low as at least 2 ps. Accordingly, as illustrated in FIG. 2B, it is necessary for the difference in the length of the optical path to be 145 mm or less and to be as equal as possible, which can be easily achieved in accordance with current process technology. This means that such an adjustment is possible even when the modulation frequency is 50 GHz (1 bit≈20 ps). Here, the group index of refraction is set at 4.1 for the dispersion relation in the silicon wire waveguide 3.

As illustrated in FIGS. 1A and 1B, a WDM optical signal inputted into the input waveguide 11 is split into a TM optical signal and a TE optical signal by the polarization beam splitter 12 in accordance with the polarization plane and the resultant signals are guided through the loop waveguide 13 in opposite directions from each other. The TM optical signal is converted to a TE* optical signal of which the polarization plane is rotated 90° by the polarization rotator 14. The TE optical signal and the TE* optical signal guided through the loop waveguide 13 are demultiplexed into their respective wavelengths ($\lambda_1$ through $\lambda_4$) by the ring waveguides $15_1$ through $15_4$ that form an ad-drop ring resonator.

The demultiplexed optical signals are inputted into a light receiver as a TE optical signal or a TE* optical signal in the same polarization state and therefore the light-receiving properties are not affected by the polarization state and thus the structure of the light receiver is not restricted by the independency of the polarization. At this time, TE optical signals and TE* optical signals propagate as illustrated in FIG. 1B, and therefore it is necessary for the optical distance to be equal, as described above, between the polarization beam splitter 12 and the first light-receiving surface, and between the polarization beam splitter 12 and the second light-receiving plane, in order to increase the light-receiving efficiency. For this purpose, a delay wire may be inserted into the output waveguides $16_1$ through $16_4$.

The light receiver may have a structure with a single light-receiving unit, where optical signals are inputted in opposite directions from each other through the first light-receiving surface and the second light-receiving surface that face each other. Alternatively, the light receiver may have a structure with a first light-receiving unit and a second light-receiving unit that are arranged parallel to each other, where optical signals are inputted in opposite directions from each other through the first light-receiving surface provided in the first light-receiving unit and through the second light-receiving surface provided in the second light-receiving unit. In the case of this structure, a light-receiving unit can be independently optimized for each polarization component, and in addition deterioration due to light leaked from the end terminal of the light-receiving unit can be prevented. That is to say, in the case of a single light-receiving unit noise occurs when a light component that has not been absorbed by the light-receiving unit leaks out into the loop waveguide 13 via the add-drop ring resonator array 17.

Alternatively, the light receiver may have a structure with a single light-receiving unit where optical signals enter in the same direction through the first light-receiving surface and the second light-receiving surface using a 3 dB photo coupler with two input ports and two output ports. The use of the 3 dB photo coupler can allow an intensity distribution having two peaks to be gained irrelevant of the relationship between the TE optical signal and the TE* optical signal in terms of the relative intensity. As a result, the density of photo carriers created inside the light receiver can be reduced and therefore it is possible to reduce the power consumption and to increase the speed of the light receiver at the same time.

In addition, it is desirable for the above-described light receiver to have a light absorbing layer made of single crystal germanium grown on a silicon wire waveguide since Ge has a large absorptivity of light that propagates through a silicon wire waveguide.

Furthermore, a heating means such as a microheater for adjusting the length of the optical path may be provided to each ring waveguide $15_1$ to $15_4$ so that the wavelength that transmits through the ring waveguide $15_1$ to $15_4$ can be microscopically adjusted. Moreover, a heating means such as a microheater for microscopically adjusting the length of the optical path may be provided to each output waveguide $16_1$ to $16_4$.

Figure 12:
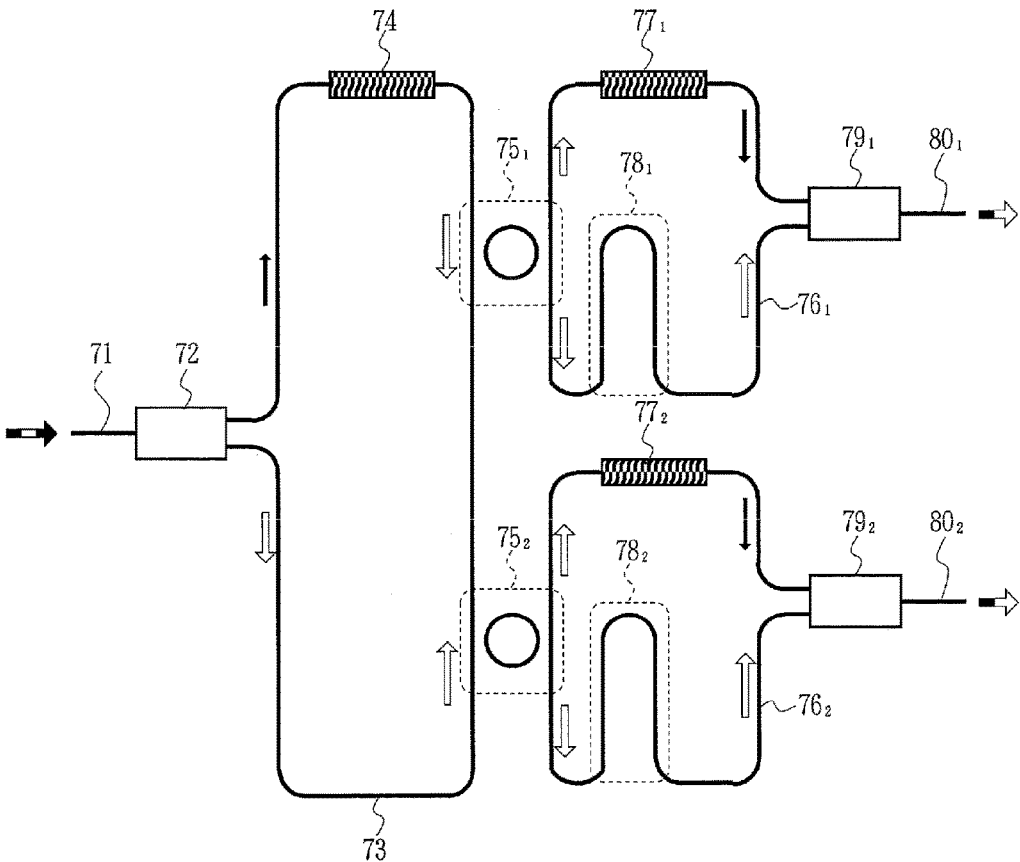
FIG. 12 is a schematic plan diagram illustrating a conventional wavelength division multiplexing optical receiver.

As described above, the wavelength division multiplexing optical receiver according to the embodiment of the present invention does not need a polarization rotator or a polarization multiplexer in the second stage as in the wavelength division multiplexing optical receiver in FIG. 12, and therefore the occurrence of excess loss can be suppressed. In addition, light that enters the light receiver is only of the TE mode type, and thus the polarization state is constant and therefore it is unnecessary for the light receiver to operate independent of the polarization.

Example 1

Figure 3:
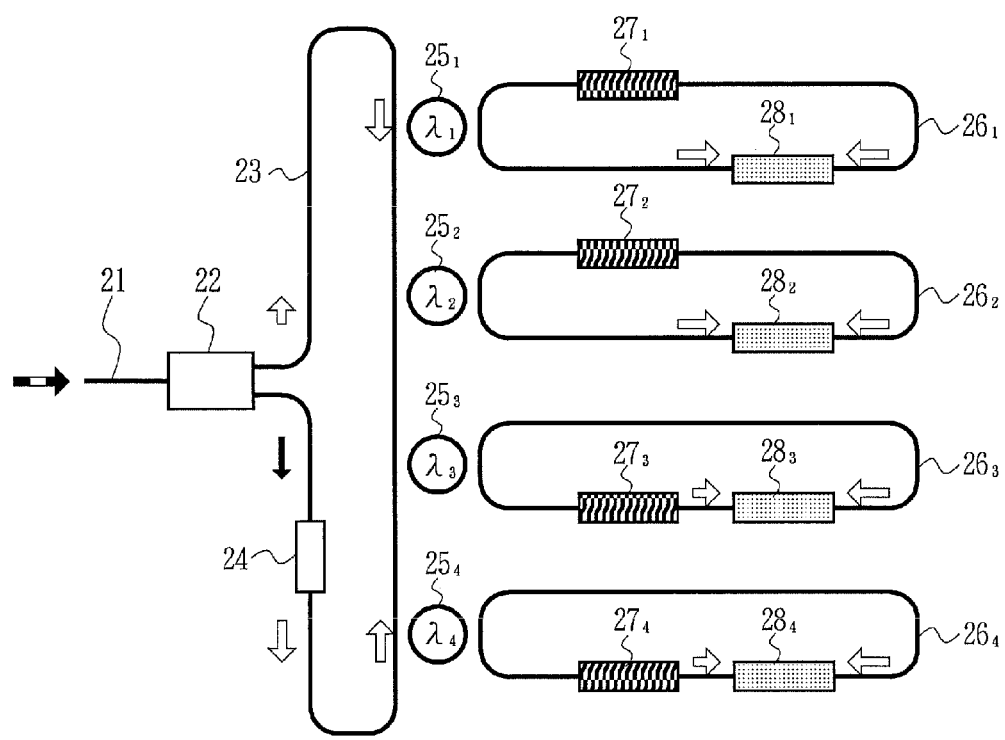
FIG. 3 is a schematic plan diagram illustrating the wavelength division multiplexing optical receiver according to Example 1 of the present invention.
Figure 4A:
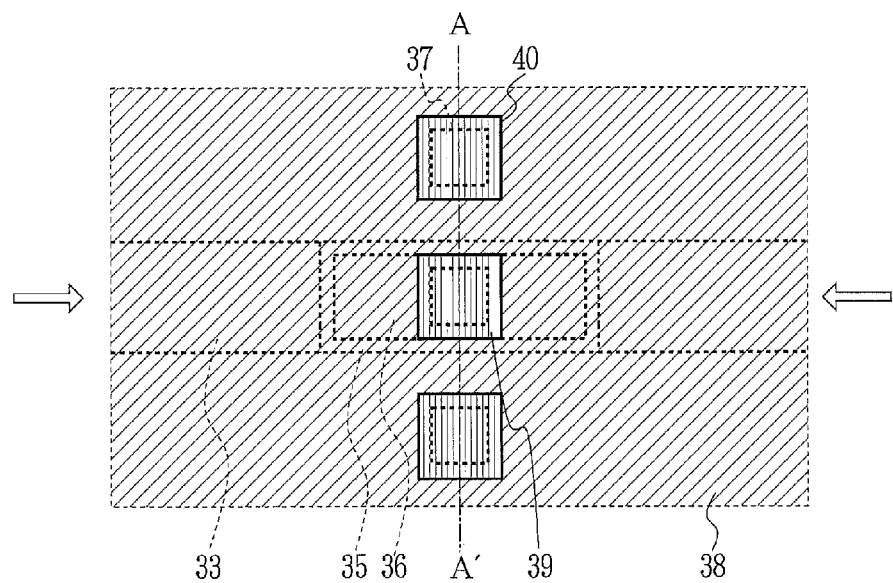
FIGS. 4A and 4B are schematic diagrams illustrating the structure of a photodiode used in the wavelength division multiplexing optical receiver according to Example 1 of the present invention.
Figure 4B:
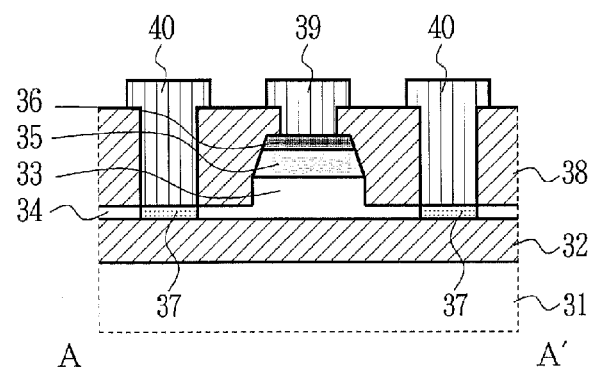

Next, the wavelength division multiplexing optical receiver according to Example 1 of the present invention is described in reference to FIGS. 3, 4A and 4B. FIG. 3 is a schematic plan diagram illustrating the wavelength division multiplexing optical receiver according to Example 1 of the present invention. An input waveguide 21 made of a silicon wire waveguide is connected to a polarization beam splitter 22 for dividing multiplexed light that has entered through the input waveguide 21 into TE signal light and TM signal light in accordance with the polarization plane. The output end of this polarization beam splitter 22 is connected to a loop waveguide 23 made of a silicon wire waveguide through which the TE signal light and the TM signal light propagate in opposite directions from each other, and this loop waveguide 23 is connected to a polarization rotator. Here, the polarization beam splitter 22 is a directional coupler type polarization beam splitter made of a silicon wire waveguide, and the polarization rotator 24 is an eccentric double core type polarization rotator made of a silicon wire waveguide.

In addition, the loop waveguide 23 is optically coupled to a number of ring waveguides $25_1$ through $25_4$ that are made of silicon wire waveguides wherein the optical paths thereof differ in length, and that form an add-drop ring resonator array. Furthermore, on the drop port side each of these ring waveguides $25_1$ through $25_4$ is optically coupled to an output waveguide $26_1$ to $26_4$ made of a silicon wire waveguide having two output ports. This add-drop ring resonator array becomes a demultiplexer (DeMUX).

In this case, the demultiplexed wavelengths can be controlled by optimizing the curvature radius R of the ring waveguides $25_1$ through $25_4$. In the case where four waves with channel intervals of 200 GHz are generated, for example, the relative relationships between $R_1$ through $R_4$ in the respective ring waveguides $25_1$ through $25_4$ may be $R_1=8$ μm, $R_2=R_1-\delta R$, $R_3=R_2-\delta R$ and $R_4=R_3-\delta$, where $\delta R$ is approximately 8 nm. Meanwhile, $\delta R$ may be adjusted in order to change the channel intervals and in the case where four waves with channel intervals of 400 GHz are generated, for example, $\delta R$ may be set at 16 nm.

Each of the output waveguides $26_1$ through $26_4$ extending from these two output ports is connected to a photodiode $28_1$ to $28_4$ with a delay wire $27_1$ to $27_4$ inserted in such a manner that the optical distance is equal between the polarization beam splitter 22 and the first light-receiving surface and between the polarization beam splitter 22 and the second light-receiving surface.

FIGS. 4A and 4B are schematic diagrams illustrating the structure of a photodiode used in the wavelength division multiplexing optical receiver according to Example 1 of the present invention. FIG. 4A is a plan diagram and FIG. 4B is a cross-sectional diagram along the single dotted chain line A-A' in FIG. 4A. As illustrated in FIGS. 4A and 4B, an SOI substrate is used where a single crystal Si layer having a thickness of 250 nm is provided on top of a Si substrate 31 with a BOX layer 32 made of $SiO_2$, which also works as a lower clad layer, in between.

A pattern for the silicon wire waveguide in FIG. 3 is created on the single crystal Si layer through conventional lithography and etching carried out in accordance with a light exposure process. In this case, the lithography may be carried out through exposure to light or exposure to an electron beam, and the etching used is dry etching, such as reactive ion etching. At this time, as illustrated in FIG. 4B, etching is carried out so that the height of the slab portions 34 is 50 nm, and thus a single crystal Si core layer 33, having a width of 480 nm and a height of 200 nm, is formed.

In a photodiode formation region, a non-doped Ge layer to become an i-type Ge light absorbing layer 35 is epitaxially grown selectively, and after that P ions, which are an n-type impurity, are implanted into the surface so as to form an $n^+$-type Ge contact layer 36. Meanwhile, B ions, which are a p-type impurity, are implanted into the slab portions 34 on the two sides of the single crystal Si core layer 33 so as to form $p^+$-type Si contact layers 37.

Next, a $SiO_2$ film is deposited on the entirety of the surface so as to form an upper clad layer 38. After that, an n-side electrode 39 that is made of Al and reaches the $n^+$-type Ge contact layer 36 and a p-side electrode 40 that is made of Al and reaches the $p^+$-type Si contact layer 37 are formed, and thus a photodiode is complete.

In Example 1 of the present invention, unlike the prior art neither a polarization rotator nor a polarization multiplexer is necessary in the second stage, and therefore the occurrence of loss accompanying the conversion of polarization can be suppressed, and at the same time the structure can be simplified. In addition, only TE beam enters the photodiode, and therefore characteristics of the operation independent of polarization are rendered unnecessary.

Example 2

Figure 5:
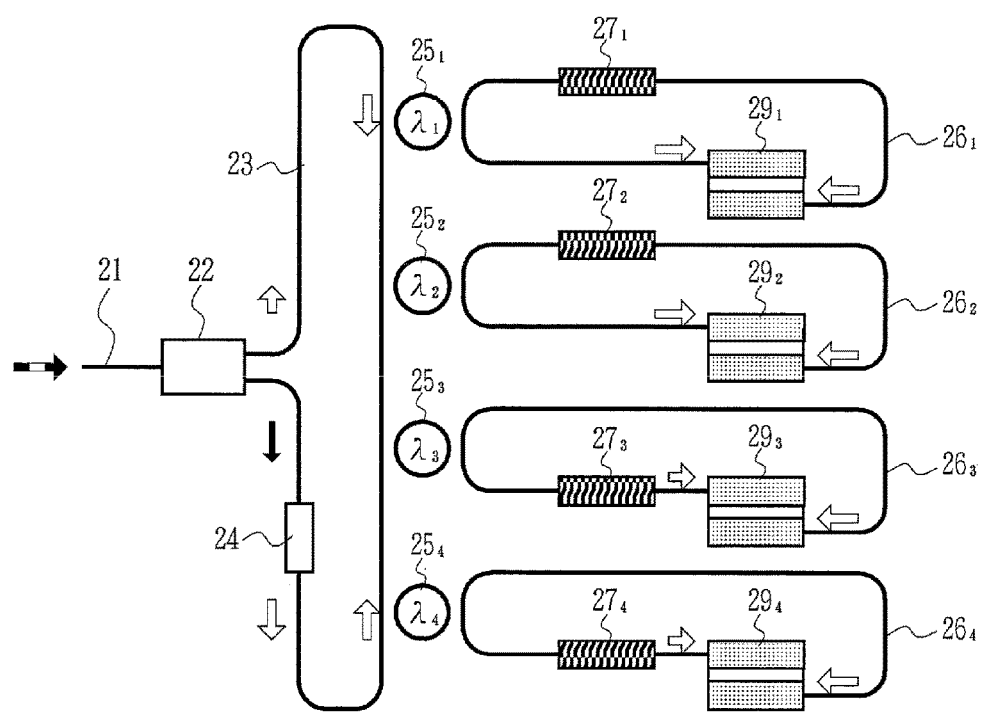
FIG. 5 is a schematic plan diagram illustrating the wavelength division multiplexing optical receiver according to Example 2 of the present invention.
Figure 6A:
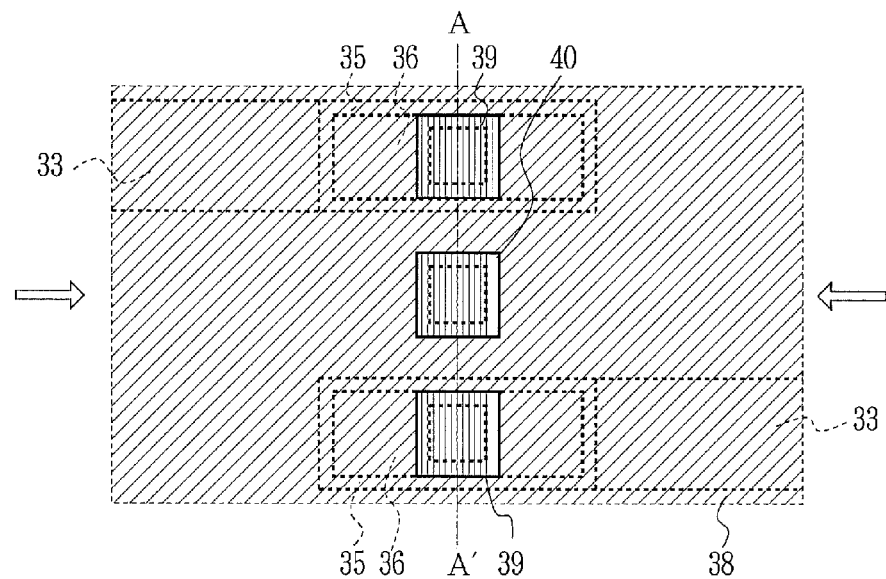
FIGS. 6A and 6B are schematic diagrams illustrating the structure of a photodiode used in the wavelength division multiplexing optical receiver according to Example 2 of the present invention.
Figure 6B:
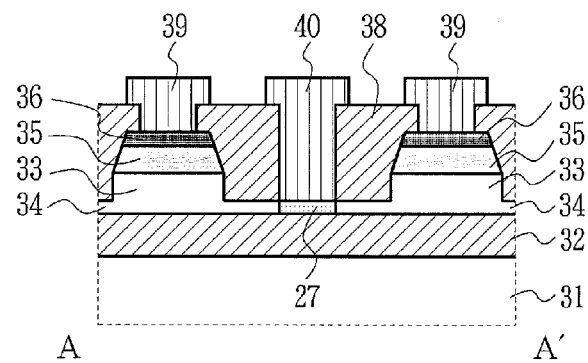

Next, the wavelength division multiplexing optical receiver according to Example 2 of the present invention is described in reference to FIGS. 5, 6A and 6B. The structure thereof is exactly the same as in Example 1, with the exception of the structure of the photodiodes and therefore only the different portions are described. FIG. 5 is a schematic plan diagram illustrating the wavelength division multiplexing optical receiver according to Example 2 of the present invention, wherein photodiodes $29_1$ through $29_4$ of which the two light-receiving regions are arranged parallel to each other are used.

FIGS. 6A and 6B are schematic diagrams illustrating the structure of a photodiode used in the wavelength division multiplexing optical receiver according to Example 2 of the present invention. FIG. 6A is a plan diagram is a plan diagram and FIG. 6B is a cross-sectional diagram along the single dotted chain line A-A' in FIG. 6A. As illustrated in FIGS. 6A and 6B, two PIN type photodiodes as in FIG. 4B are provided so as to be parallel to each other and B ions are implanted into the slab portion 34 between these photodiodes so as to form a $p^+$-type Si contact layer 37.

In the wavelength division multiplexing optical receiver in Example 2, two photodiodes having the same structure are aligned parallel to each other so that currents that flow through both photodiodes combine, and therefore the properties of the photodiode for each polarization component can be optimized independently. In addition, light that has leaked out from the end terminal of each diode cannot enter into the loop waveguide 23 via the ring resonator by progressing through the output waveguides $26_1$ through $26_4$ in the opposite direction, and therefore occurrence of noise can be suppressed.

Example 3

Figure 7:
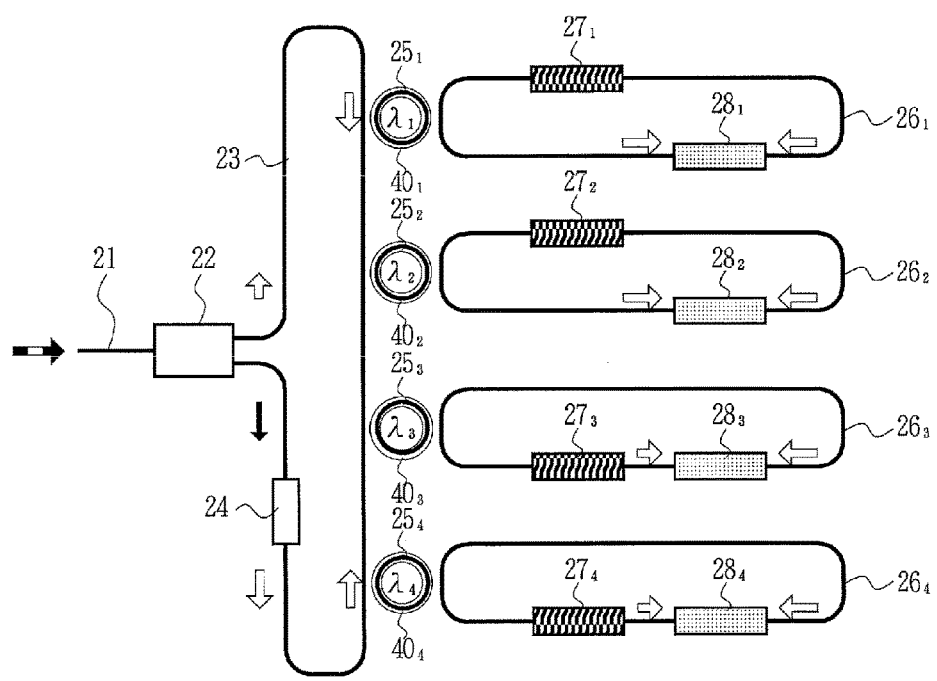
FIG. 7 is a schematic plan diagram illustrating the wavelength division multiplexing optical receiver according to Example 3 of the present invention.
Figure 8A:
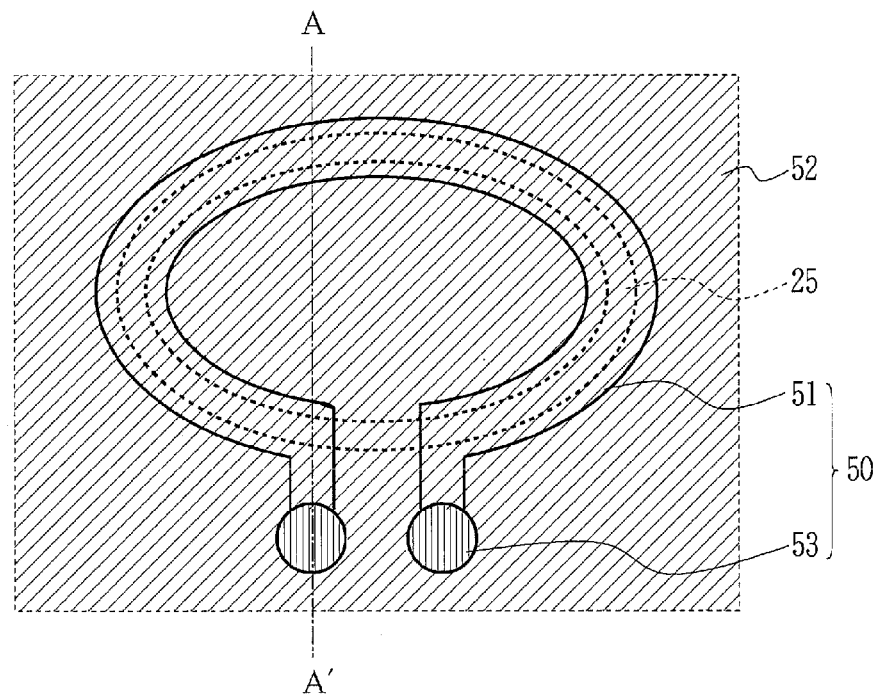
FIGS. 8A and 8B are diagrams illustrating the microheater in the wavelength division multiplexing optical receiver according to Example 2 of the present invention.
Figure 8B:
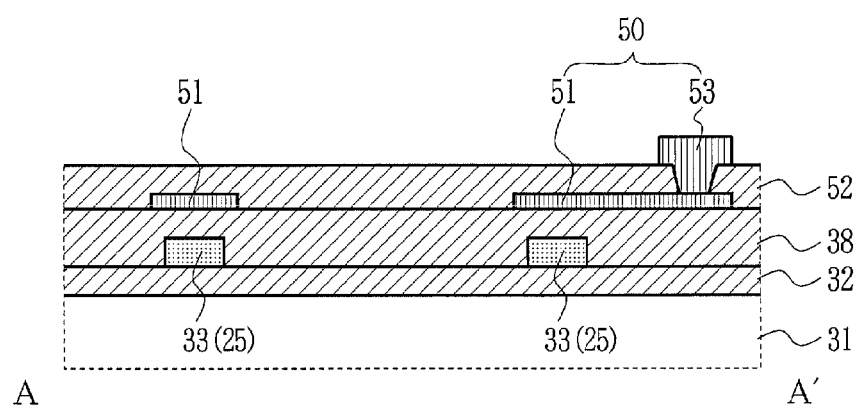

Next, the wavelength division multiplexing optical receiver according to Example 3 of the present invention is described in reference to FIGS. 7, 8A and 8B. The structure thereof is exactly the same as in Example 1, with the exception that microheaters are provided above the ring waveguides, and therefore only the different portions are described. FIG. 7 is a schematic plan diagram illustrating the wavelength division multiplexing optical receiver according to Example 3 of the present invention, wherein a microheater $50_1$ to $50_4$ for effectively adjusting the length of the optical path is provided above each ring waveguide $25_1$ to $25_4$.

In some cases, the wavelengths of light that transmits through add-drop ring resonators may be inconsistent during the process for CMOS fabrication. In such a case, WDM signals cannot be demultiplexed as designed. Thus, a microheater $50_1$ to $50_4$ is provided above each ring waveguide $25_1$ to $25_4$ so that the wavelengths of transmission light can be controlled by changing the index of refraction through the application of heat. Here, the index of refraction of the single crystal Si core layer becomes higher when the temperature is increased through the application of heat and the wavelengths shift toward the longer side of the wavelength spectrum.

FIGS. 8A and 8B are diagrams illustrating a microheater in the wavelength division multiplexing optical receiver of Example 3. FIG. 8A is a schematic plan diagram and FIG. 8B is a schematic cross-sectional diagram along the single dotted chain line A-A' in FIG. 8A. As illustrated in the figures, a Ti pattern 51 is formed on top of the upper clad layer 38 that covers the single crystal Si core layer 33 that becomes a ring waveguide 25. Next, the entire surface is again covered with a protective insulating film 52 made of a $SiO_2$ film and after that Al contact electrodes 53 are provided in end portions of the Ti pattern 51 so as to provide a microheater 50.

As described above, in Example 3 of the present invention a microheater is provided above the ring waveguide and therefore the wavelength of light that transmits through the add-drop ring resonator can be microscopically adjusted as necessary, and thus demultiplexing is possible as designed even when inconsistencies occur during the process for CMOS fabrication.

Example 4

Figure 9:
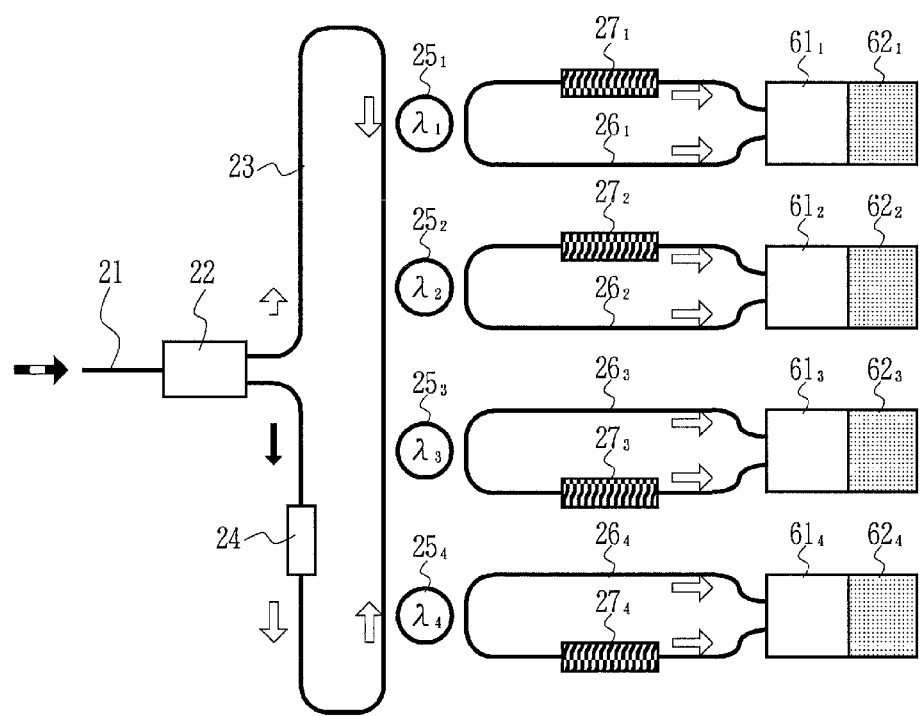
FIG. 9 is a schematic plan diagram illustrating the wavelength division multiplexing optical receiver according to Example 4 of the present invention.
Figure 10A:
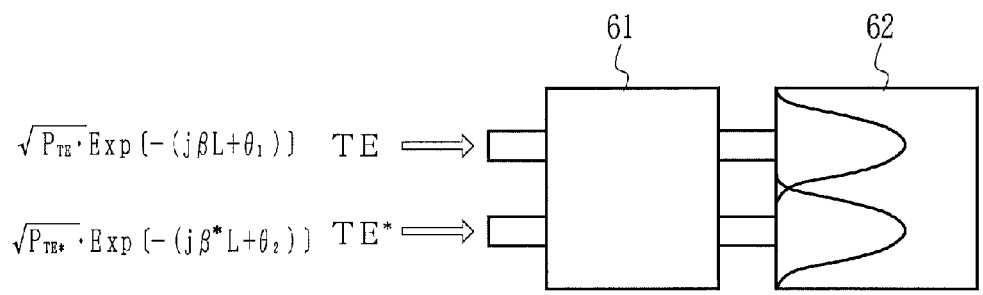
FIGS. 10A and 10B are a diagram and a graph for illustrating the light intensity distribution in a 3 dB photo coupler.
Figure 10B:
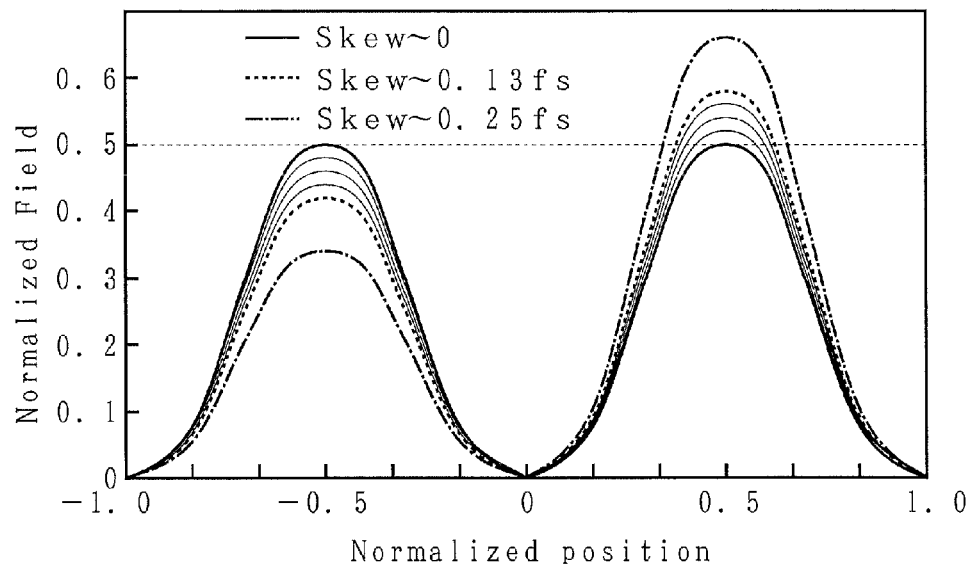

Next, the wavelength division multiplexing optical receiver according to Example 4 of the present invention is described in reference to FIGS. 9, 10A and 10B. The structure thereof is exactly the same as in Example 1, with the exception that light is received via a 3 dB photo coupler and therefore only the different portions are described. FIG. 9 is a schematic plan diagram illustrating the wavelength division multiplexing optical receiver according to Example 4 of the present invention, wherein light from the two output ports of the output waveguide $26_1$ to $26_4$ enters the photodiode $62_1$ to $62_4$ on the same light receiving surface side via the 3 dB photo coupler $61_1$ to $61_4$.

In this case, light is inputted into the photodiodes $62_1$ through $62_4$ in the same direction, and therefore no deterioration occurs due to light leaking from the terminal of a photodiode. However, light interference occurs between two input signals since light enters in the same direction and the effect of this is described below in reference to FIGS. 10A and 10B.

FIGS. 10A and 10B are a diagram and a graph for illustrating the light intensity distribution in a 3 dB photo coupler. FIG. 10A is a schematic diagram illustrating complex electrical fields of two input components and a 3 dB photo coupler and photodiode including their peripheries, and FIG. 10B illustrates and example of calculated light intensity distribution in the 3 dB photo coupler for the two inputs. When expressed as complex electrical fields, the two input components TE and TE* can be represented as $(P_{TE})^{1/2} \cdot \mathrm{Exp}\{-(j\beta L + \theta_1)\}$ and $(P_{TE^*})^{1/2} \cdot \mathrm{Exp}\{-(j\beta^* L + \theta_2)\}$, respectively, where P is the intensity of each signal, $\beta$ is the propagation constant of each signal, $\theta$ is the phase of each input signal and L is the distance from the polarization beam splitter 22.

In the case of polarization diversity, the two inputs have random intensities P. However, the two inputs can be coupled via the 3 dB photo coupler 61 so that an intensity distribution with two peaks can be gained irrelevant of the relationship between the relative intensities as long as there is no initial phase difference $\Delta\theta = \theta_1 - \theta_2$ between the signals. As a result, light can be received while dispersing the power of light signals and therefore the density of photo carriers generated inside the photodiode 62 can be reduced and therefore it is possible to reduce the power consumption and to increase the speed of the photodiode 62 at the same time.

Here, the basic assumption of the intensity balance between the two peaks in FIG. 10A is $\Delta\theta = 0$. $\Delta\theta$ is caused due to the skew, where the size of $\Delta\theta$ does not depend on the modification frequency (several tens of GHz, for example) but depends on the light frequency itself (~193 THz≈5.1 fs). Accordingly, the skew for achieving the condition that doesn't affect the deterioration of reception efficiency, $\Delta\theta < 0.1\pi \cdot \mathrm{rad.}$, for example, is ~0.25 as in FIG. 10B and thus highly precise skew control is required.

Such light interference in the 3 dB photo coupler $61_1$ to $61_4$ greatly depends on the skew. The skew control significantly depends on the node in the CMOS process, and the lower the process node is, that is to say the greater the reduction in the width of the wires is, the greater the improvements in the performance of the skew control. In the case of a 130 nm node process for CMOS (65 nm process for CMOS), for example, a skew of 0.25 fs can be sufficiently achieved when a waveguide pattern as in FIG. 9 is formed for the range of the optical path length L~750 μm (L>2000 μm).

In Example 4 of the present invention light is inputted into a photodiode via a 3 dB photo coupler in the same direction, and therefore noise does not occur due to leaking light.

Example 5

Figure 11:
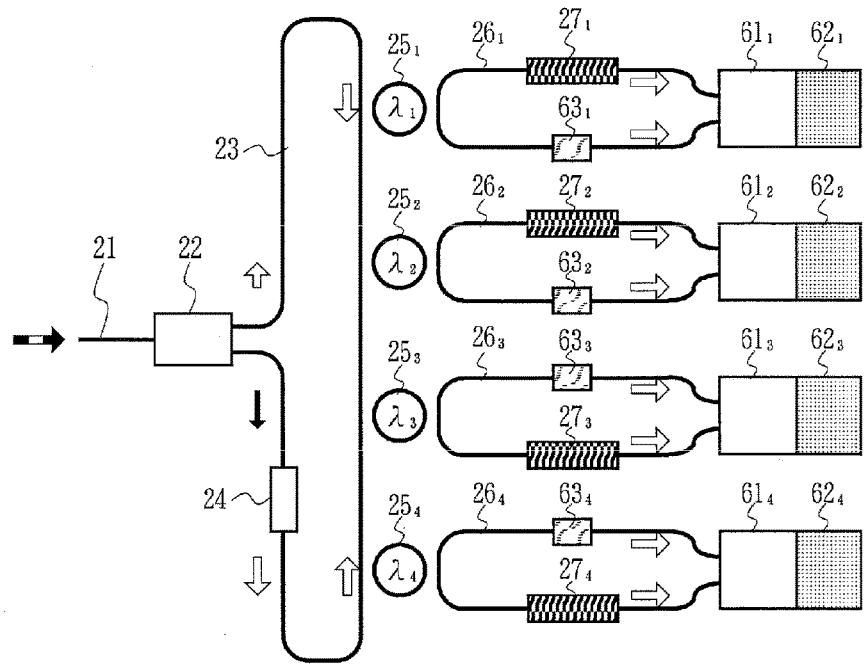
FIG. 11 is a schematic plan diagram illustrating the wavelength division multiplexing optical receiver according to Example 5 of the present invention.

Next, the wavelength division multiplexing optical receiver according to Example 5 of the present invention is described in reference to FIG. 11. The structure thereof is exactly the same as the above-described structure in Example 4, with the exception that microheaters for microscopically adjusting the length of the optical path of an output waveguide are provided and therefore only the different portions are described. FIG. 11 is a schematic plan diagram illustrating the wavelength division multiplexing optical receiver according to Example 5 of the present invention, wherein microheaters $63_1$ through $63_4$ are provided above partial regions of the output waveguides $26_1$ through $26_4$. In this case, the microheaters $63_1$ through $63_4$ are provided by forming a Ti pattern and providing Al contacts to the end portions of the Ti pattern in the same manner as the microheaters in FIGS. 8A and 8B.

In some cases, the skew has a value outside a predetermined range due to inconsistencies during the process for CMOS fabrication. In such a case, the phase can be controlled by means of the microheaters $63_1$ through $63_4$ as illustrated in the figure so that the skew can be easily adjusted.

While the examples are described above, the invention is not limited to the configuration or the conditions described in each example and various modifications are possible. For example, a microheater may be provided above a ring waveguide in Example 2, Example 4 or Example 5 in the same manner as in Example 3. While microheaters are provided above the waveguides only on one output port side, microheaters may be provided above the waveguides on both output port sides.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength division multiplexing optical receiver, comprising:
   an input waveguide made of a silicon wire waveguide;
   a polarization beam splitter connected to the input waveguide in order to divide light inputted from the input waveguide into a first signal and a second signal in accordance with a polarization plane;
   a loop waveguide connected to an output end of the polarization beam splitter and made of a silicon wire waveguide through which the first signal and the second signal propagate in opposite directions from each other;
   a polarization rotator inserted into the loop waveguide in order to rotate the polarization plane of the second signal by 90°;
   a number of ring waveguides made of silicon wire waveguides having different optical path lengths optically coupled to the loop waveguide on an add port side of each of the ring waveguides;
   output waveguides made of silicon wire waveguides optically coupled to each of the ring waveguides on a drop port side and having two output ports; and
   light receivers connected to an output waveguide without having to go via a polarization rotator or a polarization multiplexer in such a manner that the optical distances between the polarization beam splitter and a first light-receiving surface and between the polarization beam splitter and a second light-receiving surface are equal, wherein each of the light receivers has first and second light-receiving units that are arranged so as to be parallel to each other and optical signals are inputted through the first light-receiving surface provided in the first light-receiving unit and the second light-receiving surface provided in the second light-receiving unit in opposite directions from each other.

2. The wavelength division multiplexing optical receiver according to claim 1, wherein the light-receiving units include single crystal germanium grown on a silicon wire waveguide.

3. The wavelength division multiplexing optical receiver according to claim 1, further comprising a delay wire inserted into each of the output waveguides in such a manner that the optical distances between the polarization beam splitter and the first light-receiving surface and between the polarization beam splitter and the second light-receiving surface are equal.

4. The wavelength division multiplexing optical receiver according to claim 1, further comprising a heating means for adjusting the optical path length provided in each of the ring waveguides.

5. The wavelength division multiplexing optical receiver according to claim 1, further comprising a heating means for adjusting an optical path length provided in each of the output waveguides.

* * * * *